United States Patent
Hsu et al.

(10) Patent No.: US 7,173,780 B2
(45) Date of Patent: Feb. 6, 2007

(54) COLOR WHEEL WITH DOVETAILED BALANCING GROOVE

(75) Inventors: Pi-Tsung Hsu, Hsinchu (TW); Chih-Wei Tso, Hsinchu (TW)

(73) Assignee: Premier Image Technology Corporation, Taipei (TW)

( * ) Notice: Subject to any disclaimer, the term of this patent is extended or adjusted under 35 U.S.C. 154(b) by 0 days.

(21) Appl. No.: 11/392,880

(22) Filed: Mar. 30, 2006

(65) Prior Publication Data

US 2006/0227442 A1    Oct. 12, 2006

(30) Foreign Application Priority Data

Apr. 7, 2005   (TW) .............................. 94205392 U

(51) Int. Cl.
*G02B 5/22* (2006.01)

(52) U.S. Cl. ..................... 359/892; 359/885; 359/891; 348/743; 356/418; 353/84

(58) Field of Classification Search ............... 359/891, 359/892, 885; 348/743; 356/418; 353/84; 362/293
See application file for complete search history.

(56) References Cited

U.S. PATENT DOCUMENTS 6,958,870 B1 * 10/2005 Nguyen ...................... 359/892
6,970,309 B2 * 11/2005 Chang et al. ............... 359/892

* cited by examiner

*Primary Examiner*—Leonidas Boutsikaris
(74) *Attorney, Agent, or Firm*—Birch, Stewart, Kolasch & Birch, LLP

(57) ABSTRACT

A color wheel with dovetailed balancing groove, includes a motor, a metal ring and a set of color filter set. At a rotatable portion of the color wheel, such as the peripheral portion between the metal ring and the housing of the motor, or on the peripheral surface of the metal ring, a balancing groove with narrow opening and wider inside is formed thereon. Using the feature of a narrow opening and wider inside, glue is added into the opening and dries to become solid balancing material. The color wheel is less prone to deviate from the metal ring, even though a relative larger centrifugal force is induced and acted thereon while the color is running at higher speed and higher temperature.

19 Claims, 6 Drawing Sheets

COLOR WHEEL WITH DOVETAILED BALANCING GROOVE

FIELD OF THE INVENTION

The present invention relates to a color wheel with dovetailed balancing groove, and more particularly, to a color wheel which has a dovetailed balancing groove to keep a balancing material inside and prevent the material from diminishing, which normally is caused by the centrifugal force while the color wheel is running in a high speed and a high temperature operation.

BACKGROUND OF THE INVENTION

In order to ensure the stability, reliability and dynamic balance for a color wheel, an effective dynamic balance method and optimal structure in the manufacture process are very important. There are several methods which have been introduced in several US patents. While in dispensing the glue for bonding a color filter set on the bonding area, due to viscous flow of the glue before drying, the thickness of the glue may be coated unevenly, which would cause the color wheel to not run in perfect dynamic balance status.

Furthermore, once the glue is in excess, it may overflow and stain the filter set. When a color wheel is running at high speed and at high temperature, the centrifugal force keeps acting on the balancing material, which would cause the balancing material to decompose, deviate and finally to be lost from the color wheel. On the other hand, to prevent excess glue overflow and staining of the filter, and to lower the chance of which the balancing material deviating from the color wheel in high speed high temperature operation, U.S. Pat. No. 6,705,733 provides a color wheel structure, featuring a groove which has narrow inside and wider opening on the metal ring of the color wheel for receiving the excess glue while adhering the filter set onto the metal ring. The shape of the groove suggested by patent '733 is totally contrary to the dovetailed balancing groove of the present invention. U.S. Pat. No. 6,618,214 suggests a color wheel structure, featuring a plurality of grooves on the bonding surface of a metal ring for receiving the excess glue to prevent overflowing which may stain the filter. U.S. Pat. No. 6,598,977 provides a color wheel structure, featuring several through holes on the bonding surface of the metal ring, using the holes to let excess glue be sucked from the back of the bonding surface, thus to prevent excess glue overflow and detain the filter set, and to keep the glue coated evenly.

All the patents stated above have a groove on the metal ring for loading the balancing material and solving the problems which are caused by the excess glue or adhesive. However, all the prior art did not consider how to use the shape of the groove to help the balancing material sustain stronger centrifugal force so as not to deviate from the color wheel. The prior art also has no teaching about the design and use of the function of dovetailed balancing groove with narrow opening. However it is the main point of the present invention to use the design of the groove to overcome the problems stated above.

SUMMARY OF THE INVENTION

Therefore, the primary object of the invention is to resolve the problem of the balancing material which is prone to deviate at high speed rotation of the color wheel, and overcome the difficulty of getting an evenly coating adhesive that occurs with conventional color wheels. In order to achieve the object above, the color wheel according to the present invention provides a balancing groove with a cross-sectional shape of narrow opening and wider inside for adding some glue or balancing material. As the opening of the dovetailed balancing groove is narrower than the inside, the chance of the balancing material deviating from the groove is lowered, even when the color wheel is running at high speed.

According to an embodiment of the present invention, a color wheel with a narrow opening dovetailed balancing groove is driven by a motor and comprises a metal ring and a filter set fixed on the surface of the metal ring. The dovetailed balancing groove can be formed on a rotatable element. For instance, a balancing groove can be formed with narrow opening between the metal ring and rotating shell of the motor, or can be formed with a narrow opening groove on the metal ring. In a dynamic balance calibration process, a glue or material is added into the groove to act as a balancing material, and the narrow opening helps the balancing material to sustain more centrifugal force at high speed rotation and not to deviate away or decompose. In addition, a single circular groove, double circular groove or plural circular groove can also be added on one side of the metal ring, to act as a reference point for dispensing glue, and help the average diffusion flow of the glue. Accordingly, the color wheel according to the present invention could prevent the glue from forming on the metal ring unevenly in thickness, and thus can improve the balancing quality while the filter set are attached thereon.

It is to be understood that both the foregoing general description and the following detailed description are exemplary and explanatory only and are not restrictive of the invention, as claimed.

BRIEF DESCRIPTION OF THE DRAWINGS

The foregoing description or other characteristics, objects, features and advantages of the present invention will become more apparent upon consideration of the following detailed description, having reference to the accompanying drawings wherein.

DETAILED DESCRIPTION OF THE PREFERRED EMBODIMENTS

Figure 1:
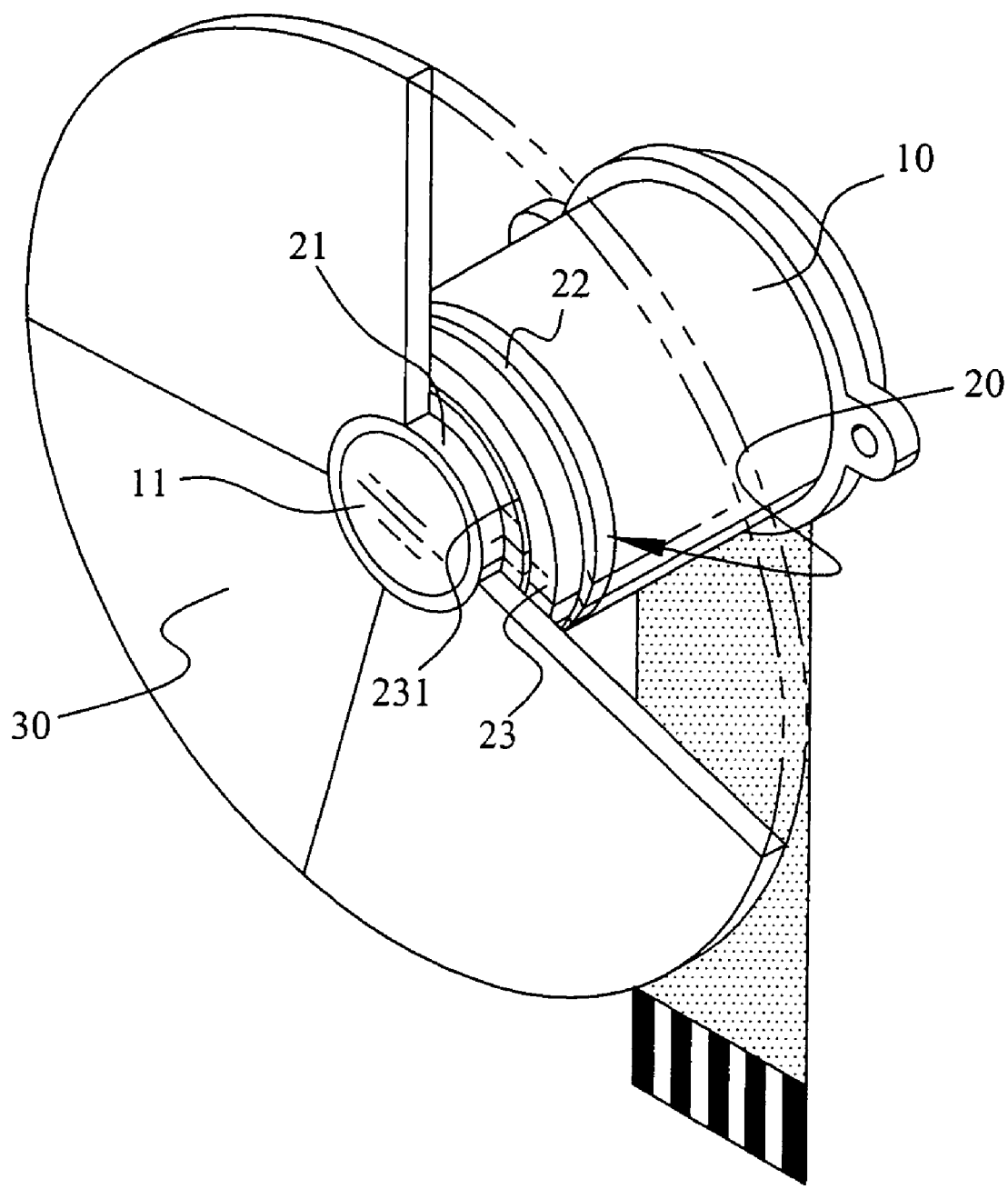
FIG. 1 is a perspective view showing an embodiment of the color wheel in accordance with the present invention.

FIG. 1 shows an embodiment of the color wheel according to the present invention connecting to a motor (10), comprising a metal ring (20) and a filter set (30). A rotor shaft is extended at the end of the motor (10) for driving the metal ring (20). The metal ring (20) contains a bulged rim (21), a balancing groove (22) and a bonding surface (23). The filter set (30) is bonded to the bonding surface (23) of the metal ring (20), and thus can run at high speed when driven by motor (10).

Figure 2:
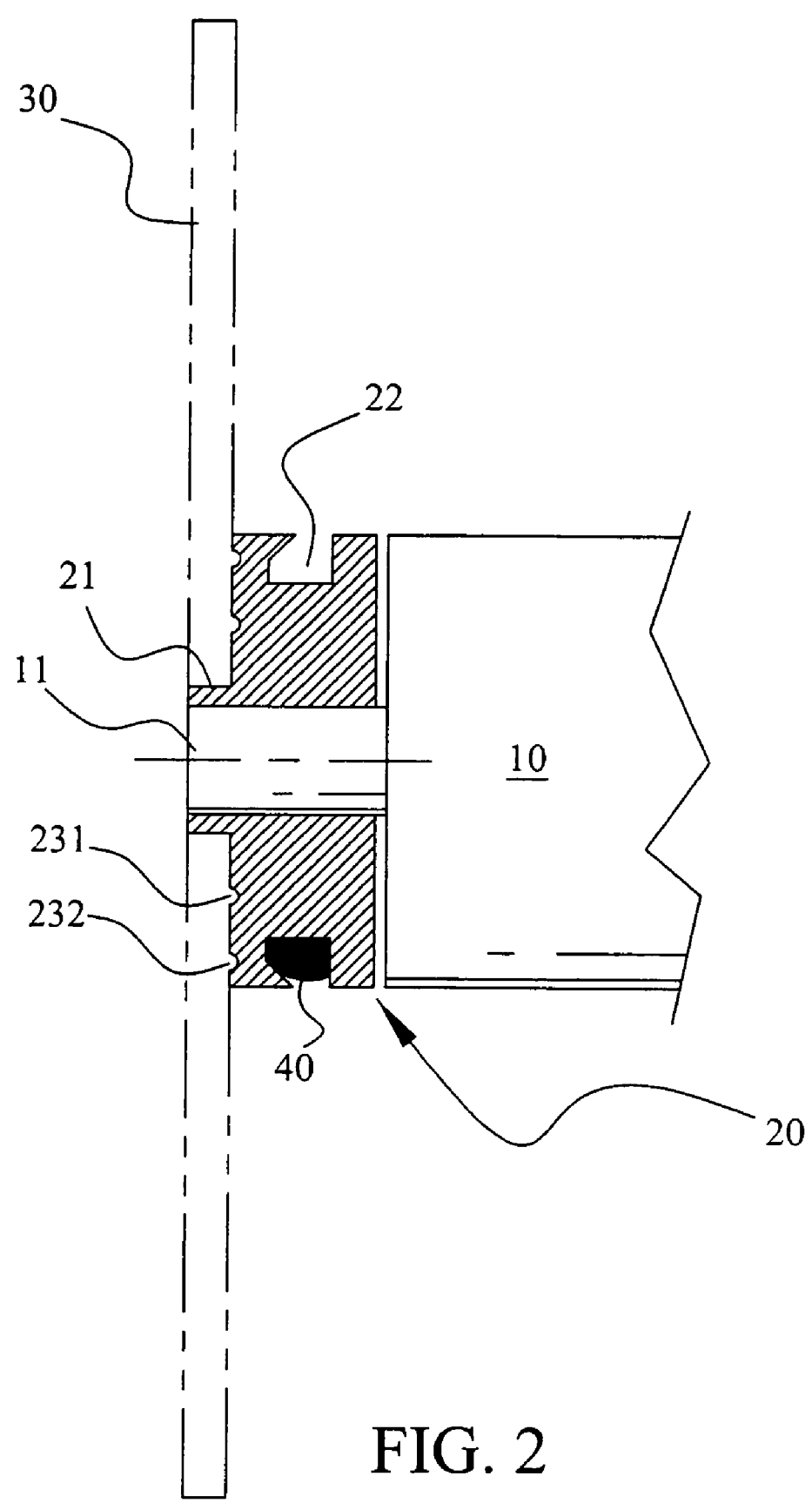
FIG. 2 is a fragmented sectional view of the color wheel of FIG. 1.

When calibrating the dynamic balancing of the color wheel, a glue or solid material for balancing (40) is added into the balancing groove (22). As shown in FIG. 2, a large centrifugal force will induce glue or solid material for balancing (40) to deviate from a traditional color wheel while it is running at high speed and high temperature for long operation. The balancing groove (22) according to the present invention is in a dovetailed shape with narrow opening to inhibit the glue or solid material for balancing (40) not to deviate from the color.

Referring again to FIG. 2, an alternative of the metal ring (20) in accordance with the present invention has a bonding surface (23) with at least one circular groove (231, 232) formed thereon. The circular grooves (231, 232) can be used as a reference point while the dispensing process coats a layer of glue to the bonding surface (23) for bonding the filter set (30). On other hand, the circular grooves (231, 232) can also function to speed up the flow of the glue, as a result, the glue can be coated evenly while the dynamic balancing is improved.

After the glue is dried and hardened and stuck inside the circular groove (231, 232), it would act as a tenon to enhance the bonding effect between the bonding surface (23) and the filter set (30). Thus the filter set (30) can be more durable in service so as not to deviate from the metal ring (20), even if it is running in high speed rotation and in high operation temperature.

Figure 3:
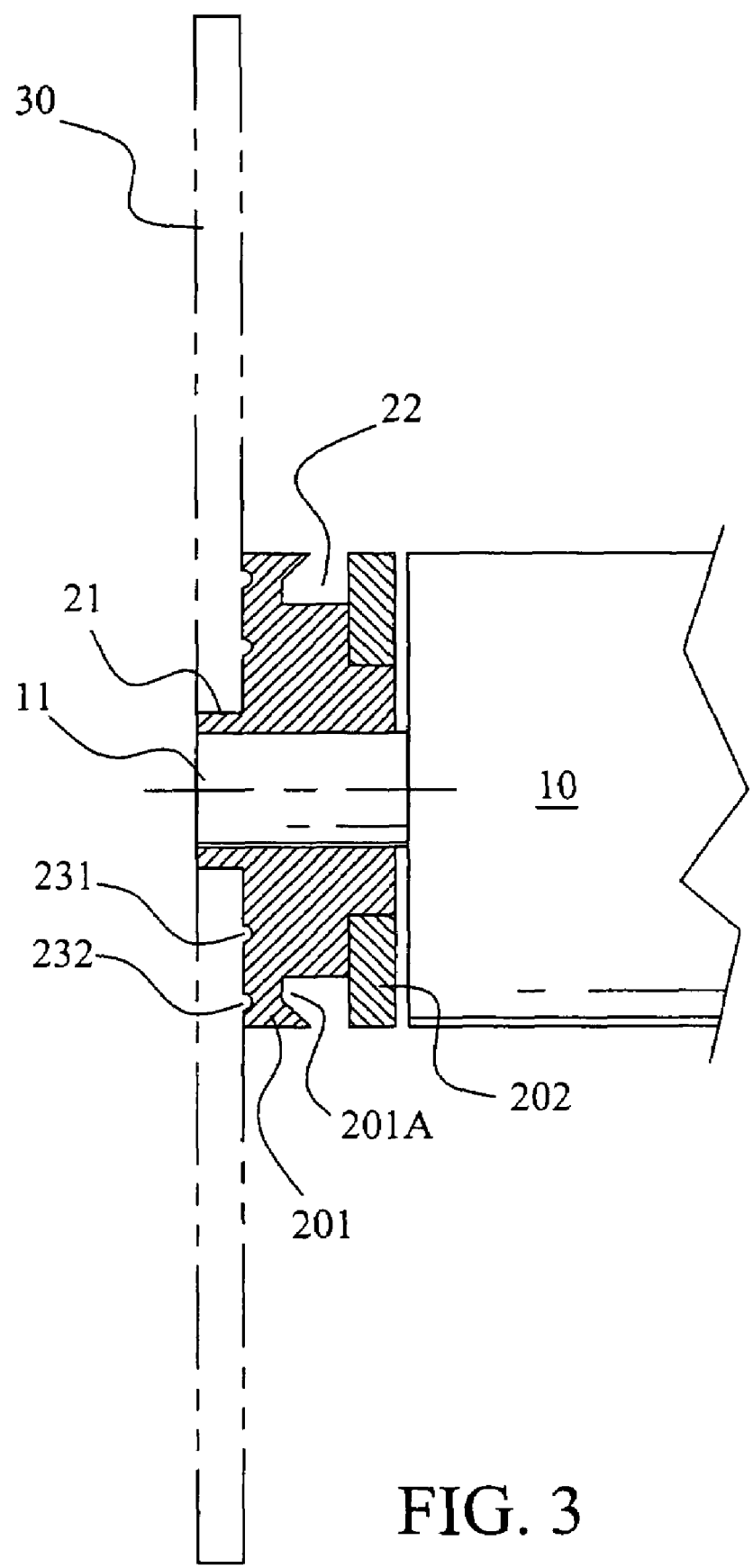
FIG. 3 is a fragmented sectional view of an alternative color wheel in accordance with the present invention.

Referring to FIG. 3, an alternative of the embodiment of metal ring (20) in accordance with the present invention, may comprise a first and second ring (201, 202). The first ring (201) has an inclined annular face to form a concave rut (201A) on one side of the balancing groove (22). The first and second ring (201, 202) are engageable together to form dovetailed balancing groove (22) with a cross-sectional shape of narrow opening and wider inside. In another alternative, the second ring 202 may also be formed with an inclined annular face to form a concave rut (not shown), so as to be assembled with the first ring (201) and form another dovetailed balancing groove (22) with narrow opening.

Figure 4:
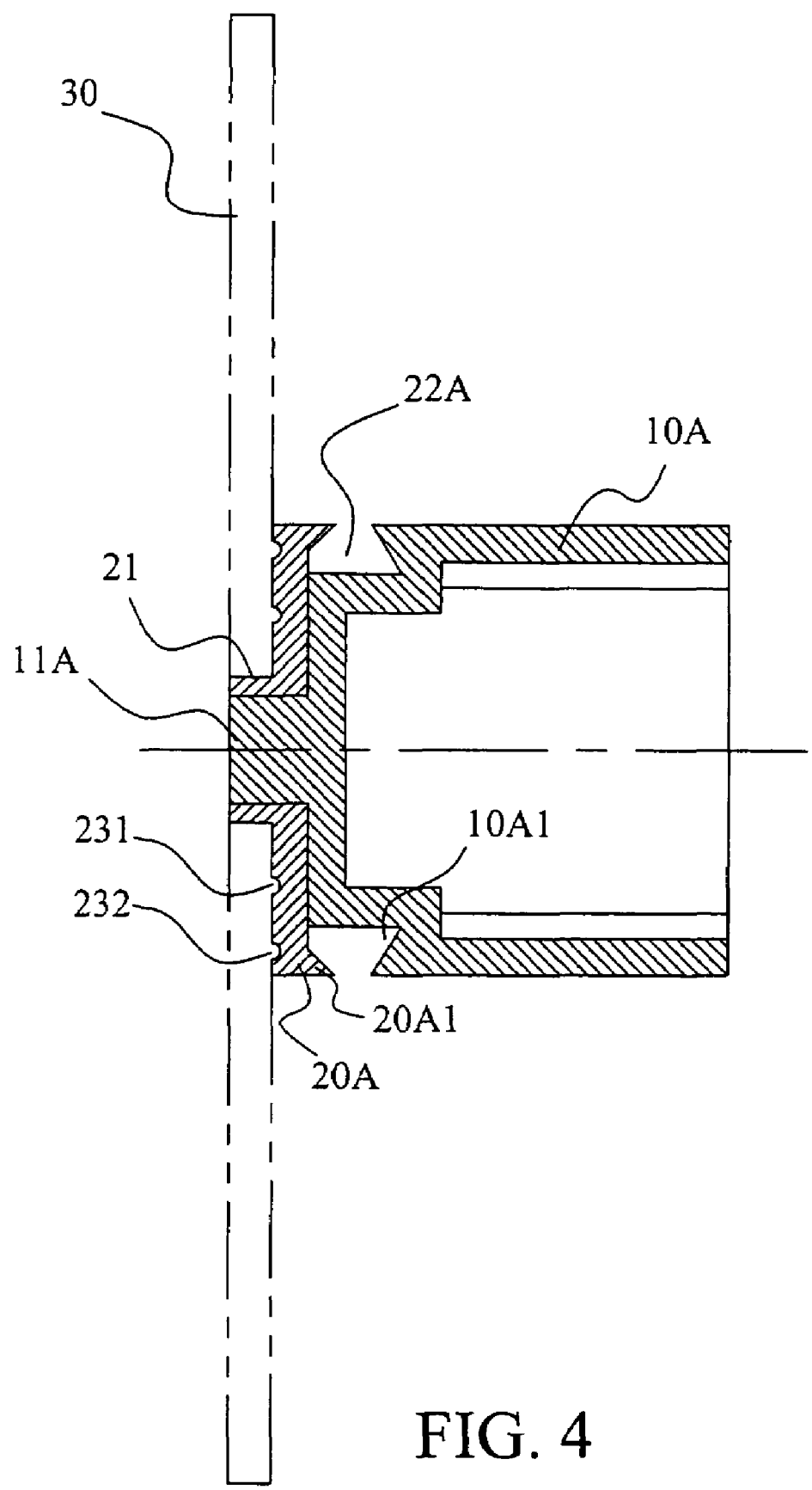
FIG. 4 is a fragmented sectional view of another alternative color wheel in accordance with the present invention.

In U.S. Pat. No. 6,604,830, a rotational shell driven by a motor running at high speed is disclosed. As shown in FIG. 4, a color wheel with the rotational shell can also be improved in accordance with this invention in an alternative embodiment, including a metal ring (20A), a filter set (30) and a rotational shell (10A). The filter set (30) is connected to the metal ring (20A), and rotor shaft (11A) is extended from one end of the motor (10A) for driving the metal ring (20A). A bulged edge (20A1) with an inclined annular surface is extended from one side of the metal ring 20A. An annular rut (10A1) with another inclined annular surface been symmetrically formed inside of the bulged edge (20A1) on the rotational shell (10A). Thus, while the metal ring (20A) and rotational shell (10A) are assembled together, a dovetailed balancing groove (22A) with narrow opening is formed therebetween.

Figure 5:
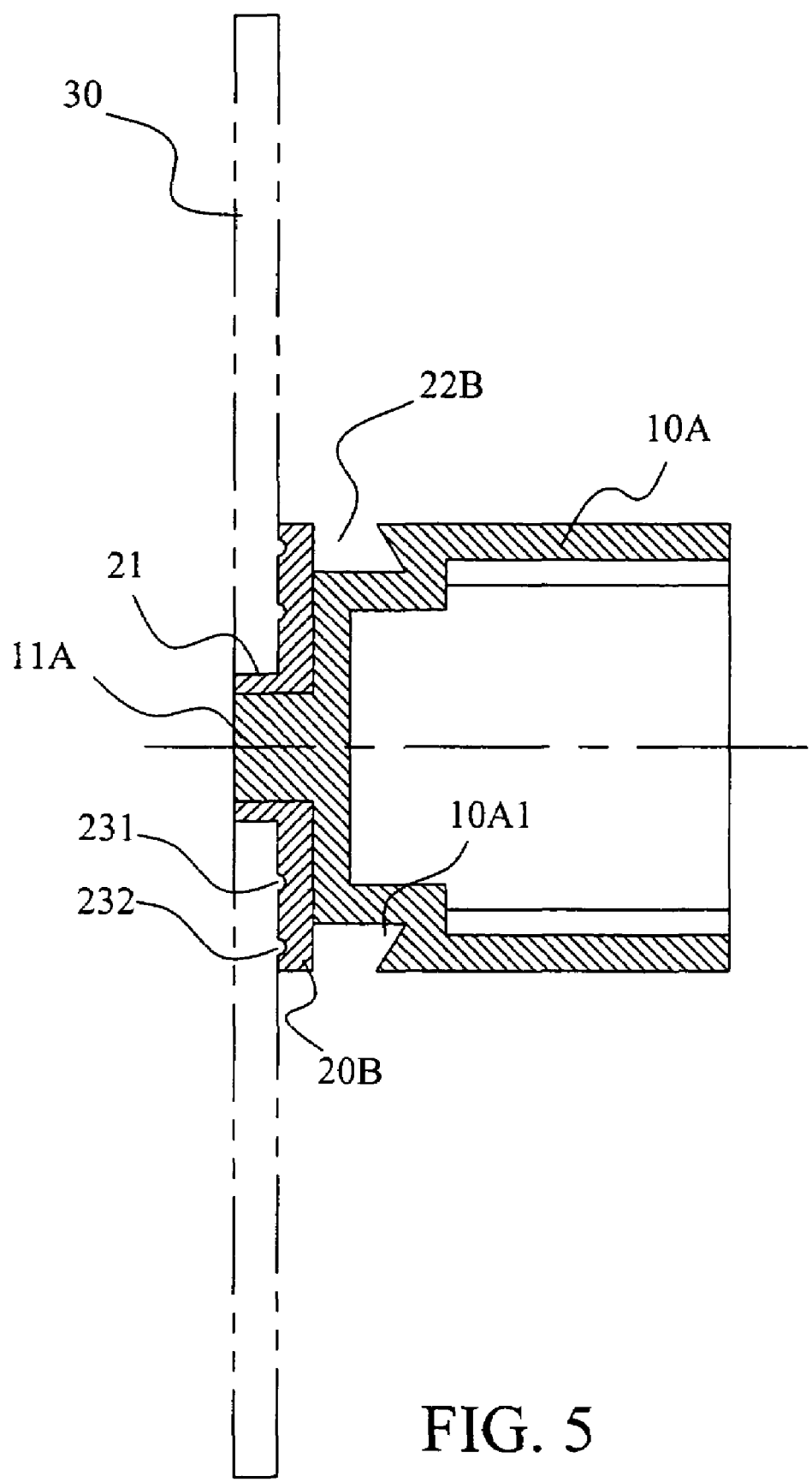
FIG. 5 is a fragmented sectional view of another alternative color wheel in accordance with the present invention.

Another alternative embodiment of the color wheel in accordance with the present invention is shown in FIG. 5 and comprises a metal ring (20B), a filter set (30) and a rotational shell (10A) that is driven by a motor in high speed rotational. The filter set 30 is bonded on the metal ring (20B), and a rotor shaft (11A) is extended from one end of the motor (10A) for driving the metal ring (20B). Instead of forming the bulged edge on the metal ring (20B) in accordance with the other embodiments, an annular rut (10A1) with an inclined surface on the rotational shell is used to form a narrow opening dovetailed balancing groove (22B), after the assembly of metal ring (20B) is connected to rotational shell (10A).

Figure 6:
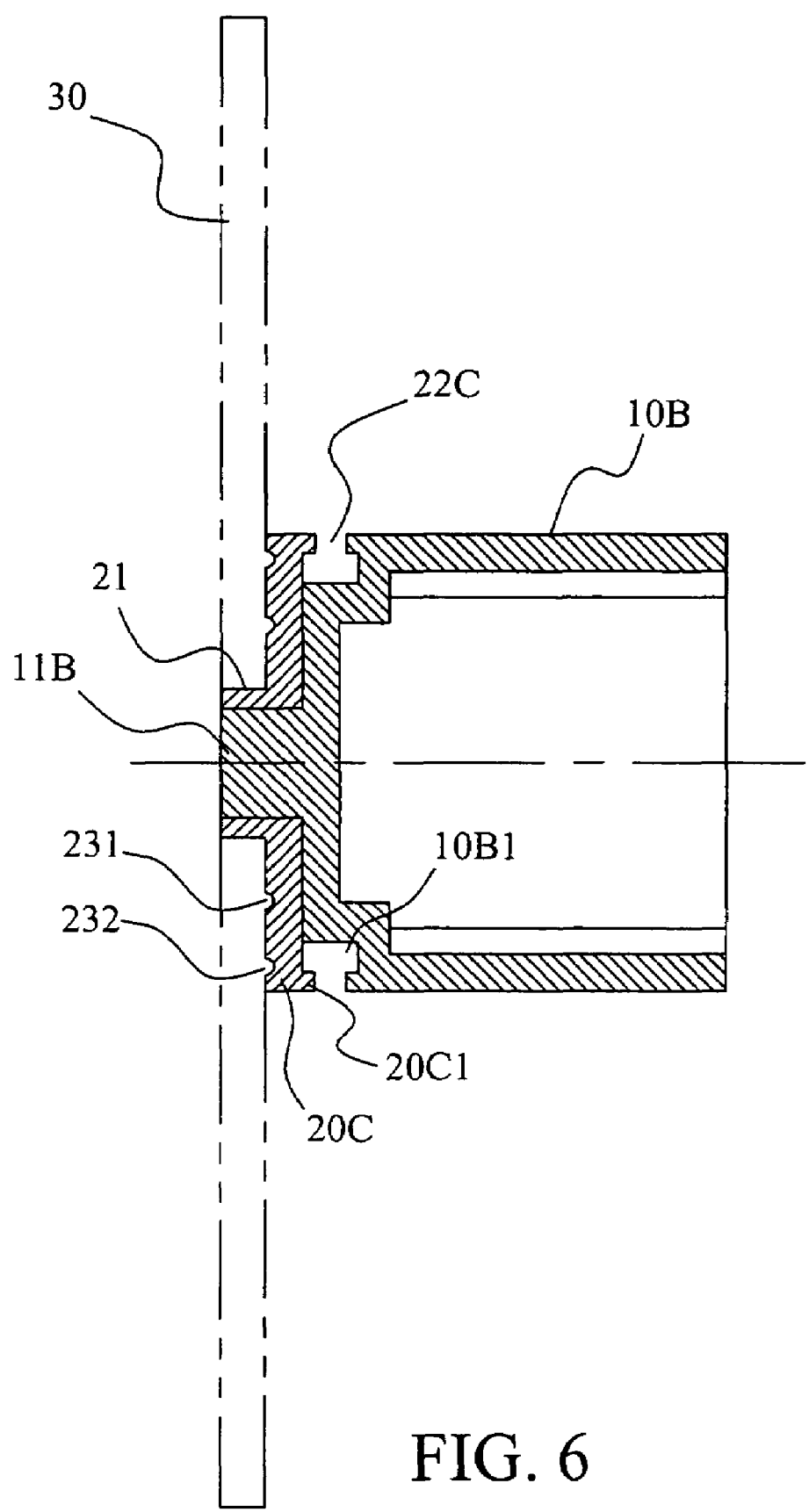
FIG. 6 is a fragmented sectional view of the color wheel of FIG. 5.

As shown in FIG. 6, another alternative embodiment of the color wheel in accordance with the present invention comprises a metal ring (20C), a filter set (30) and a rotational shell (10B). wherein the filter set (30) is bonded to the metal ring (20C), and a rotor shaft (11B) is extended from one end of the rotational shell (10B) for driving the metal ring (20C). The metal ring (20C) has a bulged edge (20C1), and the rotational shell (10B) has an annular rut (10B1). When the metal ring (20C) is connected to the rotational shell (10B), a narrow opening dovetailed balancing groove (22C) is formed therebetween.

The cross-sectional shape of the balancing groove in accordance with the present invention has a narrow opening and wider inside, which would inhibit the balancing material so as to be less prone to deviate from the color wheel in high speed and high temperature operation. Moreover, the circular groove disposed on the bonding surface of the metal ring provides a reference point for dispensing the glue. The overflowed glue would form an annular tenon to increase the bonding effect between the filter set and metal ring, which would improve the durability and service life of the color wheel.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A color wheel with dovetailed balancing groove, comprising:
   a motor with a rotor shaft;
   a metal ring, which is connected to the rotor shaft, and has a bonding surface and a balancing groove, wherein the balancing groove has a cross-sectional shape of a narrow opening and a wider inside for receiving a balancing material therein; and
   a filter set, which is stuck on the bonding surface, which is driven by the metal ring;
   wherein the metal ring is composed of a first and a second ring, and wherein the first ring has an inclined annular face inside a concave rut on one side of the balancing groove, and wherein the balancing groove with narrow opening and wider inside is formed while the first and the second rings are integrated together to form an unitary structure.

2. The color wheel with dovetailed balancing groove in accordance with claim 1, wherein the bonding surface has a single circular groove to be used as a reference point for dispensing glue for bonding the filter set.

3. The color wheel with dovetailed balancing groove in accordance with claim 1, wherein the bonding surface has a plurality of circular grooves to be used as a reference point for dispensing glue for bonding the filter set.

4. The color wheel with dovetailed balancing groove in accordance with claim 1, wherein the second ring has a bulged edge extended from one side of the balancing groove for narrowing the opening while the first and the second rings are integrated together to form an unitary structure.

5. The color wheel with dovetailed balancing groove in accordance with claim 1, wherein the second ring has an annular rut opposite to the annular rut of the first ring, and forms the balancing groove with a narrow opening, while the first and the second rings are integrated together to form an unitary structure.

6. A color wheel with dovetailed balancing groove, comprising:
   a motor with a rotor shaft;
   a metal ring, which is connected to the rotor shaft, and has a bonding surface and a balancing groove, wherein the balancing groove has a cross-sectional shape of a narrow opening and a wider inside for receiving a balancing material therein; and
   a filter set, which is stuck on the bonding surface, which is driven by the metal ring;
   wherein the metal ring is composed of a first and a second ring, and wherein the first ring has a bonding surface with a circular groove and a bulged edge, and wherein the bulged edge of the first ring extends from one side of the balancing groove for narrowing the opening while the first and the second rings are integrated together to form an unitary structure.

7. The color wheel with dovetailed balancing groove in accordance with claim 6, wherein a single circular groove is formed on the bonding surface for providing a reference point for dispensing of glue.

8. The color wheel with dovetailed balancing groove in accordance with claim 6, wherein a plurality of circular grooves is formed on the bonding surface for providing a reference point for dispensing of glue.

9. The color wheel with dovetailed balancing groove in accordance with claim 6, wherein the second ring has a bulged edge for forming the narrow opening while the first and the second rings are integrated together to form an unitary structure.

10. The color wheel with dovetailed balancing groove in accordance with claim 6, wherein the second ring has an annular rut and a bulged edge for forming the narrow opening while the first and the second rings are integrated together to form an unitary structure.

11. A color wheel with dovetailed balancing groove, comprising:
    a motor having a rotational shell and a rotor shaft extended from one end of the shell;
    a metal ring, which is connected to the rotor shaft, and has a bonding surface and a balancing groove between the metal ring and the rotational shell, wherein the balancing groove has a cross-sectional shape of a narrow opening and a wider inside for receiving a balancing material therein; and
    a filter set which is bonded on the bonding surface by glue and driven by the motor.

12. The color wheel with dovetailed balancing groove in accordance with claim 11, wherein the metal ring has a bulged edge for forming the balancing groove with narrow opening.

13. The color wheel with dovetailed balancing groove in accordance with claim 12, wherein the metal ring has an inclined annular surface inside a concave rut on one side of the balancing groove.

14. The color wheel with dovetailed balancing groove in accordance with claim 11, wherein the metal ring has a bulged edge extended from the bonding surface for positioning the filter set.

15. The color wheel with dovetailed balancing groove in accordance with claim 11, wherein the bonding surface has a single circular groove to use as a reference point for dispensing of the glue.

16. The color wheel with dovetailed balancing groove in accordance with claim 11, wherein the bonding surface has a plurality of circular grooves to use as a reference point for dispensing of the glue.

17. The color wheel with dovetailed balancing groove in accordance with claim 11, wherein the rotational shell has a bulged edge for forming the narrow opening of the balancing groove.

18. The color wheel with dovetailed balancing groove in accordance with claim 11, wherein the rotational shell has an annular rut on one side of the balancing groove for forming the narrow opening of the balancing groove.

19. The color wheel with dovetailed balancing groove in accordance with claim 18, wherein the annular rut has an inclined annular surface.

* * * * *